United States Patent [19]

Machida

[11] Patent Number: 5,560,341

[45] Date of Patent: Oct. 1, 1996

[54] APPARATUS AND METHOD FOR DIAGNOSING OCCURRENCE OF MISFIRE IN MULTI-CYLINDER INTERNAL COMBUSTION ENGINE

[75] Inventor: Kenichi Machida, Atsugi, Japan

[73] Assignee: Unisia Jecs Corporation, Atsugi, Japan

[21] Appl. No.: 423,941

[22] Filed: Apr. 19, 1995

[30] Foreign Application Priority Data

Apr. 22, 1994 [JP] Japan .................... 6-084719

[51] Int. Cl.$^6$ .................................... F02M 51/00
[52] U.S. Cl. ............................................. 123/479
[58] Field of Search .................... 123/479, 406, 123/690; 364/431.03, 431.08, 431.11, 431.12; 361/87

[56] References Cited

U.S. PATENT DOCUMENTS

| | | | |
|---|---|---|---|
| 5,109,825 | 5/1992 | Joos et al. ...................... | 123/479 |
| 5,184,595 | 2/1993 | Maeda et al. ................... | 123/690 |
| 5,186,148 | 2/1993 | Wataya ........................... | 123/479 |
| 5,195,011 | 3/1993 | Giorgetta et al. ............... | 361/87 |
| 5,209,206 | 5/1993 | Danno et al. ................... | 123/479 |
| 5,260,877 | 11/1993 | Drobny et al. ................ | 364/431.11 |
| 5,322,045 | 6/1994 | Hisaki et al. ................... | 123/406 |
| 5,331,560 | 7/1994 | Tamura .......................... | 364/431.12 |
| 5,373,448 | 12/1994 | Katogi et al. ................... | 364/431.08 |
| 5,461,569 | 10/1995 | Hara et al. ..................... | 364/431.03 |

FOREIGN PATENT DOCUMENTS 5-17172 3/1993 Japan ........................ 123/479

*Primary Examiner*—Raymond A. Nelli
*Attorney, Agent, or Firm*—Foley & Lardner

[57] ABSTRACT

In apparatus and method for diagnosing an occurrence of misfire in any one or more of combustion chambers in a multi-cylinder internal combustion engine, correction value for each cylinder $KTINT_i$ is calculated only when a predetermined period of time has passed from a time at which a fuel supply cut-off is initiated and a determination is made on the basis of TDC period TINT that an engine revolution speed is stably reduced. A learning correction value $KTINT_i$ is updated and stored in a memory to be used for the misfire diagnosis only when a deviation between learning correction values between each cylinder whose period is measured in a range of the same crank angle falls in a predetermined range. Then, the result of measurement of the period TINT is corrected by the learning correction value $KTINT_i$. A misfire determination value MISA is calculated on the basis of the corrected period TINT. Then, the presence or absence of the misfire is determined on the basis of the result of comparison between the misfire determination value MISA and a threshold (reference) value SL.

10 Claims, 4 Drawing Sheets

APPARATUS AND METHOD FOR DIAGNOSING OCCURRENCE OF MISFIRE IN MULTI-CYLINDER INTERNAL COMBUSTION ENGINE

BACKGROUND OF THE INVENTION

The present invention relates to apparatus and method for diagnosing an occurrence of misfire in any one or more of combustion chambers of a plurality of engine cylinders of an internal combustion engine on a basis of a variation in an angular velocity of the engine revolutions.

A Japanese Utility Model Registration Application First Publication No. Heisei 5-17172 exemplifies a previously proposed misfire diagnosing apparatus in which a period of a reference signal REF outputs from a crank angle sensor is measured, a variation in an angular speed of the engine is determined on the basis of the measured period so as to determine a presence or absence in the misfire.

The period at which the reference signal REF is generated is needed to correspond to a constant crank angle (crankshaft rotation angle). However, in an actual practice, it is often the case that the reference signal REF cannot be generated for each of the constant crank angles due to a mechanical deviation such as a crank angle sensor positional deviation. For example, although the generation of the reference signal REF is set at the period of 180° CA (crankshaft rotation), the reference signal REF is actually generated at a smaller or larger crank angular interval than the normal 180° CA. Therefore, an accuracy of the misfire-diagnosis becomes lower due to the variation in the period of the generation of the reference signal REF caused by the variation in the crank angle.

It is necessary to correct the period of generation of the reference signal REF so as to cope with the mechanical deviation caused by the sensor positional deviation in order to improve the accuracy of the misfire diagnosis. However, during the engine driving condition, the period described above is varied not only due to the mechanical deviation but also due to combustion deviations between respective cylinders. In addition, the variations in the period described above due to the mechanical deviation and due to the combustion deviations cannot be distinguished. Hence, since a characteristic of the deviation in the period described above due to the mechanical deviation cannot be determined, the correction of the period of the reference signal REF cannot accurately be carried out against the mechanical deviation.

SUMMARY OF THE INVENTION

It is therefore a principal object of the present invention to provide a highly accurate apparatus and method for diagnosing an occurrence of misfire in any one or more of combustion chambers of a multi-cylinder internal combustion engine which can accurately determine the characteristic of the variation in the period of the reference signal REF due to the mechanical deviation.

The above-described object can be achieved by providing an apparatus for a multi-cylinder four-cycle internal combustion engine, comprising: a) reference signal generating means for generating a reference signal for each predetermined crank angular timing; b) period measuring means for measuring a period of the reference signal; c) misfire determining means for determining a presence or absence of a misfire in any one or more of the engine cylinders on the basis of the measured period; d) learning condition determining means for detecting a fuel supply cut-off in each of the cylinders and for detecting a driving condition under which an engine revolution speed is stably reduced at a predetermined rate during the detected fuel supply cut-off, the driving condition serving as a learning condition; e) learning correction value learning means for learning correction values for the respective cylinders of the period on the basis of the measured period when said learning condition detecting means detects the driving condition serving as the learning condition; and f) period correcting means for correcting results of measurements of the period for the respective cylinders on the basis of the learning correction values learned by the correction value learning means so that said misfire determining means determines the presence or absence of the misfire on the basis of the corrected periods for the respective cylinders by said period correcting means.

The above-described object can also be achieved by providing a method for diagnosing a presence or absence of a misfire of fuel supplied in a multi-cylinder four-cycle internal combustion engine, comprising the steps of: a) generating a reference signal for each predetermined crank angular timing; b) measuring a period of the reference signal; c) determining a presence or absence of a misfire in any one or more of the engine cylinders on the basis of the measured period; d) detecting a fuel supply cut-off in each of the cylinders and detecting a driving condition under which an engine revolution speed is stably reduced at a predetermined rate during the detected fuel supply cut-off, the driving condition serving as a learning condition; e) learning correction values for the respective cylinders of the period on the basis of the measured period when the driving condition serving as the learning condition is detected at the step d); f) correcting results of measurements of the period for the respective cylinders on the basis of the learning correction values learned at the step e) so that the presence or absence of the misfire is determined at the step c) on the basis of the corrected periods for the respective cylinders; and g) providing a warning when the misfire occurrence is determined at the step f).

In the misfire diagnosing apparatus defined herein, although the misfire diagnosis is carried out on the basis of the period of the reference signal REF output whenever the crankshaft rotation angle timing comes, the correction value(s) for the period(s) of the reference signal generation timing(s) are learned during the particular engine driving condition such that the fuel supply to the engine is being cut off and the engine revolution speed indicates a stable reduction at a constant rate. The determination of presence or absence in the misfire is based on the corrected period(s) according to the learned correction value(s).

BEST MODE CARRYING OUT THE INVENTION

Reference will hereinafter be made to the drawings in order to facilitate a better understanding of the present invention.

Figure 1:
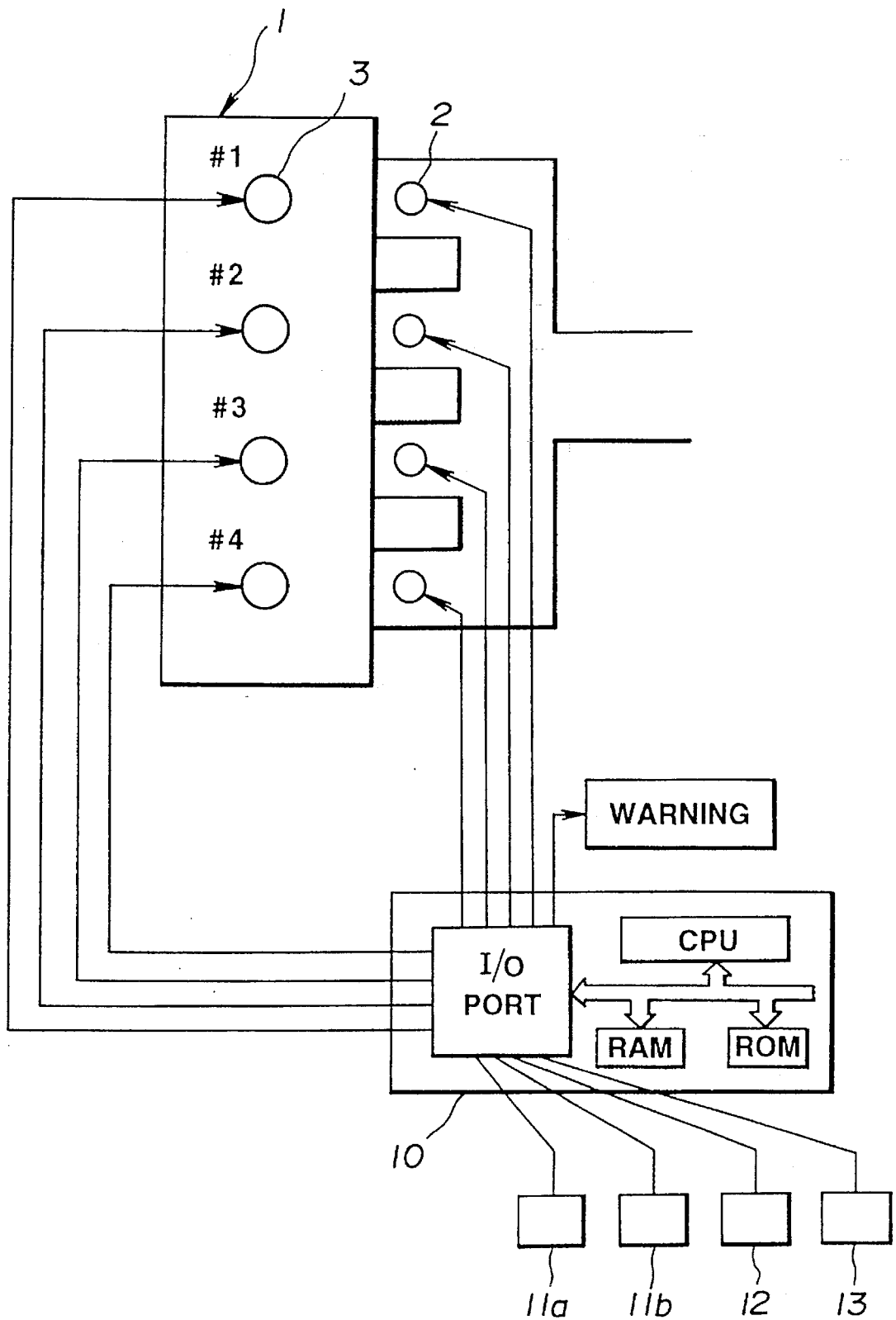
FIG. 1 is a schematic circuit block diagram of an apparatus for diagnosing an occurrence of misfire in any one or more of combustion chambers of a multi-cylinder internal combustion engine in a preferred embodiment according to the present invention.

FIG. 1 shows a preferred embodiment of an apparatus for diagnosing a misfire occurrence in any one or more of combustion chambers of a multi-cylinder internal combustion engine.

It is noted that the internal combustion engine shown in FIG. 1 is a four-cycle (four-stroke) four-cylinder engine and its ignition order is set such that first cylinder #1→third cylinder #3→fourth cylinder #4→and second cylinder #2.

A control unit 10 includes a microcomputer having generally a CPU, RAM (Random Access Memory), I/0 port, and common bus. The control unit receives various sensor signals, executes an arithmetic operation on the basis of the received sensor signals, and controls, for example, opens and closures of fuel injection valves 2 installed in each branched passage of respective cylinders (#1 through #4) and ignition timings for respective ignition coils 3.

The various sensors described above include a cam sensor 11a, ring gear sensor 11b, airflow meter 12, and an idling switch 13.

The cam sensor 11a disposed on a cam shaft of the engine picks up an engine revolution signal and outputs, in the embodiment, a 180° CA signal whenever a crankshaft of the engine has revolved through 180° corresponding to a stroke phase difference between engine cylinders (for example, BTDC70° (BTDC is an abbreviation for Before Top Dead Center). It is noted that in the case of six cylinder engine, the output signal from the cam sensor 11a is 720°/6=120° CA).

In addition, the ring gear sensor 11b is disposed on a ring gear of a flywheel of the engine and outputs a unit angular signal for example 1° whenever the engine crankshaft has revolved through 1° (unit crank angular displacement).

In the control unit 10, a reference signal REF for each TDC (predetermined crank angle timing) is generated on the basis of the 180° CA signal and unit angular signal.

The airflow meter 12 is for example constituted by a hot-wire type airflow meter which is so constructed and arranged as to detect an intake air quantity Q of the engine 1.

The idling switch 13 outputs an ON (high level) signal to the control unit 10 when an engine throttle valve is fully closed.

The control unit 10 calculates a basic fuel injection quantity Tp (=K×Q/Ne, K denoting a constant) on the basis of the intake air quantity Q and engine revolution speed Ne, defines a final fuel injection quantity Ti (=Tp×COEF, (COEF denotes various fuel injection quantity correction coefficients) with various corrections made, and outputs a drive pulse signal whose pulsewidth corresponds to the final fuel injection quantity Ti to a corresponding one of the respective fuel injection valves 2 for each cylinder at a predetermined timing synchronized with the engine revolution so as to inject fuel into the corresponding one of chambers.

It is noted that if the idling switch 13 outputs the ON signal to the control unit 10 and the engine 1 falls in a predetermined deceleration condition such that the engine revolution speed Ne is equal to or above a predetermined fuel cut-off revolution speed, the control unit 10 halts the output of the drive pulse signal to each fuel injection valve 2 so that the engine 1 does not receive the fuel supply (hereinafter called, fuel cut-off). This fuel cut-off is released when the engine revolution speed Ne is below a predetermined fuel recovery revolution speed or when the idling switch 13 outputs an OFF (predetermined low level) signal to the control unit 10.

The control unit 10 determines the ignition timing on the basis of the engine revolution speed Ne and basic fuel injection quantity Tp. The control unit 10 controls the operation of the ignition coil 3 at the determined ignition timing so that an ignition of the fuel supplied to each engine cylinder through a corresponding one of ignition plug installed in each combustion chamber is carried out.

Figure 2:
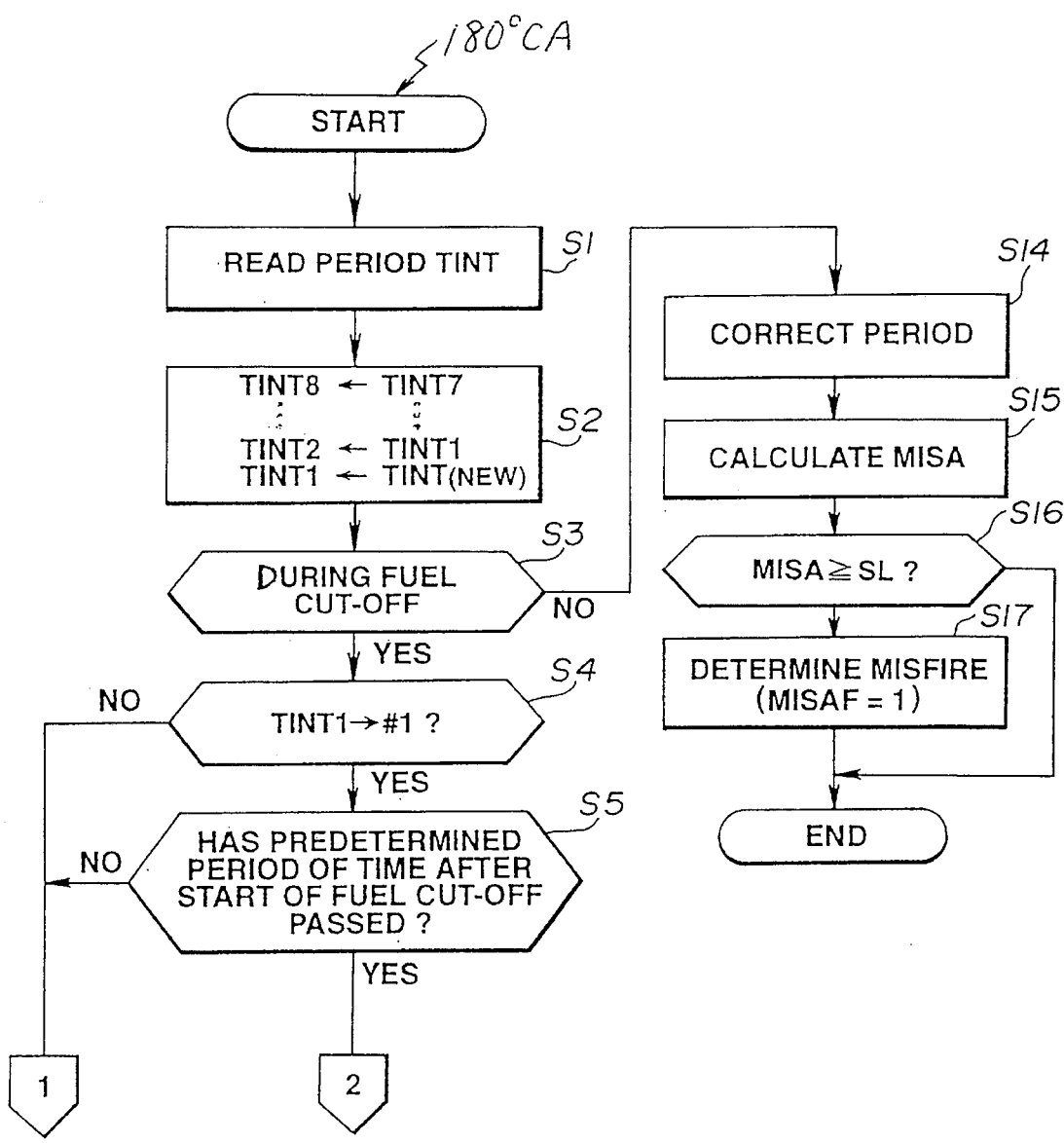
FIGS. 2A and 2B are integrally operational flowchart executed by a control unit shown in FIG. 1.
Figure 2B:
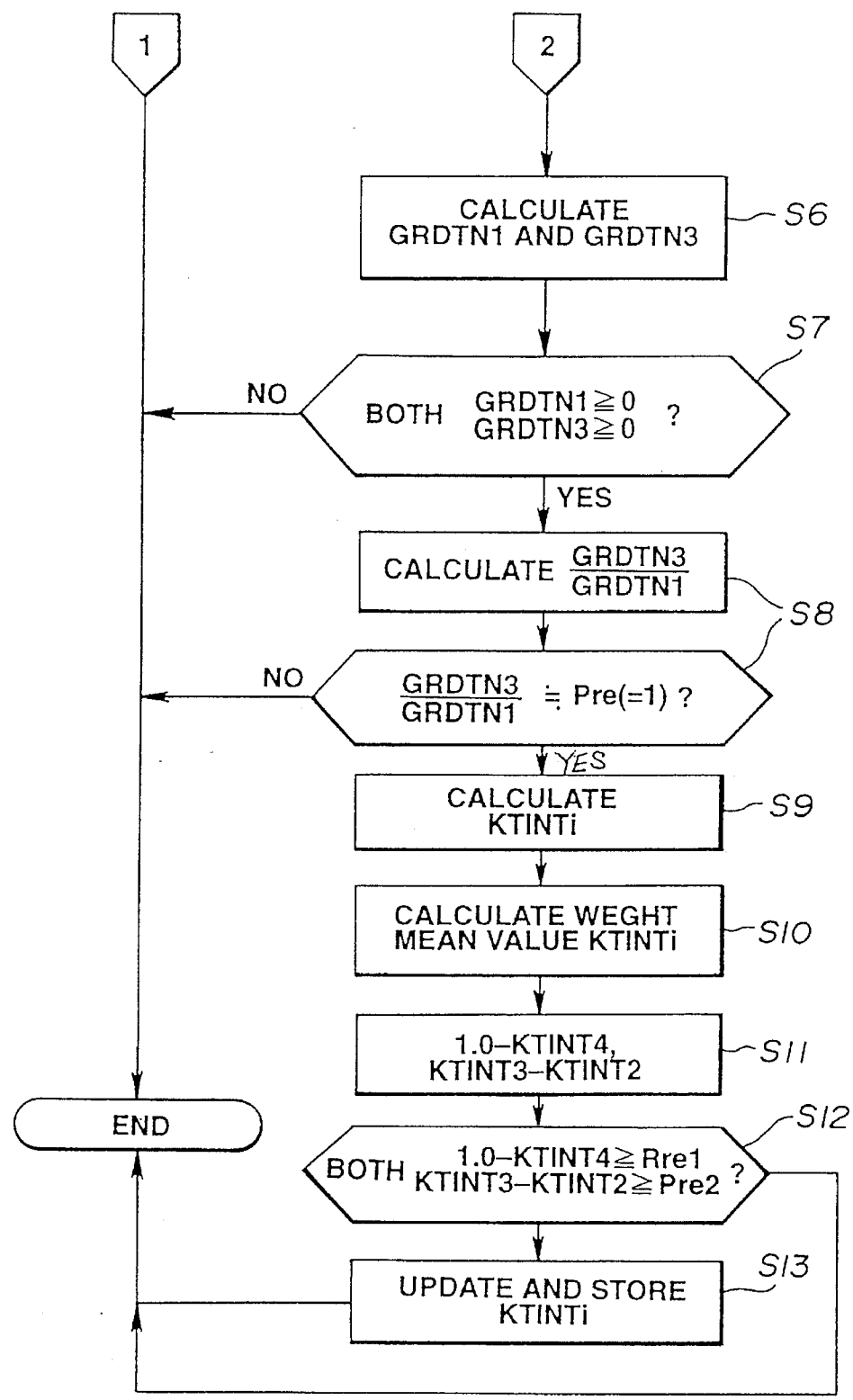

Furthermore, the control unit 10 determines the occurrence of misfire in accordance with a misfire diagnosis routine shown in FIGS. 2A and 2B. When the control unit 10 determines the occurrence of misfire, the control unit 10 issues a warning signal to a warning lamp to turn on it to inform of the occurrence of misfire.

The misfire diagnosis routine shown in FIGS. 2A and 2B will be explained with reference to FIGS. 3 and 4.

It is noted that the diagnostic routine shown in FIGS. 2A and 2B is executed as an interrupt job whenever the control unit 10 receives the 180° CA signal from the cam sensor 11a. At a step S1, the CPU of the control unit 10 reads the latest (newest) measured value of the generation period TINT of the reference signal REF output for each TDC.

At the step S2, a time series stored data of the above-described period TINT is updated in accordance with the latest measured value of the period TINT derived at the step S1. In the embodiment, past eight period data of TINT1 through TINT8 including the latest period of TINT1 as appreciated from FIG. 3. The past stored data TINT1 through TINT7 are updated to TINT2 through TINT8 and the latest period of TINT at the step S1 is set as the latest value of TINT1.

At a step S3, the CPU determines whether the fuel supply cut-off is being carried out.

If Yes (fuel cut-off is being carried out) at the step S3, the routine goes to a step S4 in which the CPU determines whether a condition of learning a deviation in the generation timing of the reference signal REF is established. It is noted that since, during an engine driving condition wherein a fuel supply is usually carried out, combustion deviations between the respective cylinders permit no accurate learning of the mechanical deviation in the generation timing described above, the above-described learning is carried out under a prerequisite that the engine driving condition such that the fuel supply is being cut off in which no influence of the combustion deviation is received. Further to make a more accurate learning, the determination of the learning condition is carried out at a step S4 or its subsequent steps.

At the step S4, the CPU determines whether the latest period of TINT1 is measured so as to correspond to a combustion state in the first cylinder #1 which is the reference cylinder of learning in accordance with the ignition order.

Figure 3:
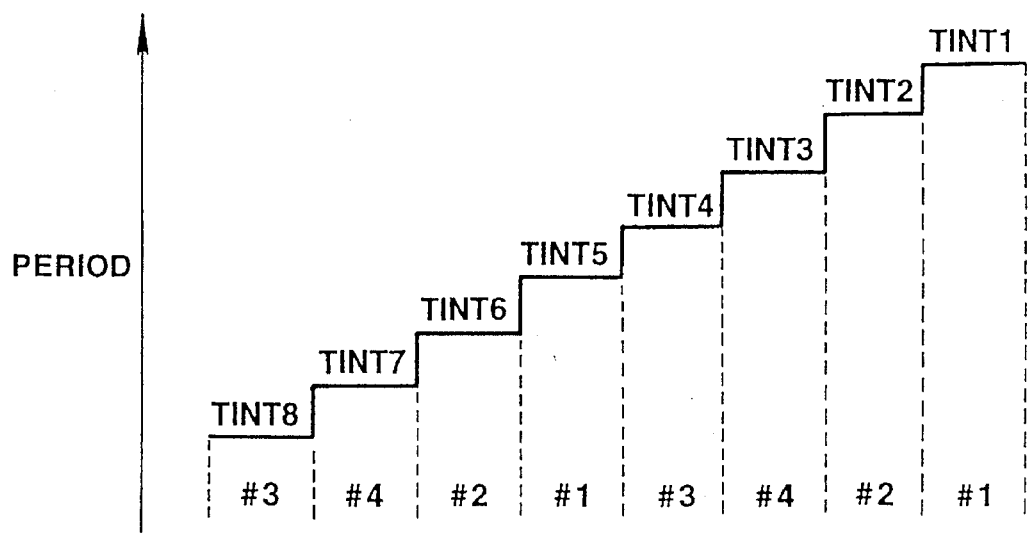
FIG. 3 is a characteristic graph representing a characteristic of measurement of the period in the embodiment shown in FIGS. 1 through 2B.

In a case where the latest period of TINT1 corresponds to the combustion state of the first cylinder #1 (Yes) at the step S4, the CPU has confirmed that each stored data of TINT1 through TINT8 which corresponds to each one of the combustion states of the respective cylinder numbers is taken as shown in FIG. 3.

Then, the routine goes to a step S5 in which the CPU determines whether a passed time from the time at which the fuel supply cut off is initiated is equal to or in excess of a predetermined period of time or not.

Only if Yes, namely, it takes the predetermined period of time at the step S5, the routine goes to a step S6.

Figure 4:
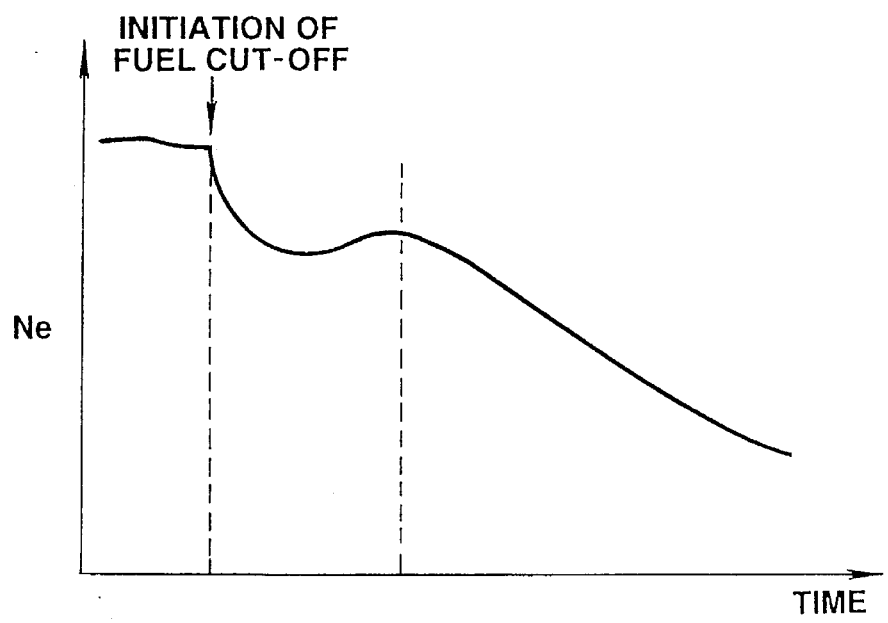
FIG. 4 is an explanatory view for explaining a correlation between a fuel cut-off procedure and engine revolution speed.

This is because during the predetermined period of time immediately after the initiation of the fuel supply cut-off, a variation of the engine revolution speed Ne is unstable as shown in FIG. 4. A high possibility of erroneous learning such that the variation in the period due to the variation in the engine revolution speed Ne is caused by the mechanical deviation due to the generation timing of the reference signal REF would be brought out. The time duration after the predetermined period of time during which the engine revolution speed Ne can be estimated to be generally reduced is the learning condition.

At the step S6, the CPU calculates two variation rates GRDTN1 and GRDTIN3 of the period of TINT in the following equations:

$$GRDTN1=(TINT1-TINT5)/4,$$

$$GRDTN3=(TINT4-TINT8)/4.$$

At a step S7, the CPU determines whether both variation rates GRDTN1 and GRDTN3 are equal to or above zeros or not.

When the period value of TINT is reduced, both of the variation rates of GRDTN1 and GRDTN3 are calculated to indicate minus values. Thus, if both of tile variation rates GRDTN1 and GRDTN3 are equal to or larger than zeros, at least the period of TINT does not indicate the reduction corresponding to the increase in the engine revolution speed Ne.

It is noted that since both variation rates GRDTN1 and GRDTN3 are calculated according to the periods of TINT1 and TINT5 corresponding to the combustion state of the first cylinder #1 and according to the periods of TINT4 and TINT8 corresponding to the combustion state of the third cylinder #3, respectively (in order words, calculated as the period change for one combustion cycle), no influence of the mechanical variation in the crank angle by which the periods are measured gives the result of calculations of the variation rates of GRDTN1 and GRDTN3 and the CPU can accurately determine whether the variation rates of GRDTN1 and GRDTN3 cause the engine revolution speed Ne to really be reduced.

The learning for the variation in the reference signal generation timing during the fuel supply cut-off can avoid the influence of the combustion variation and has a purpose to make the variation in the generation timing of the reference signal REF learn without influence of the revolution variation when the engine revolution speed Ne is reduced at a constant rate due to the fuel supply cut-off.

Hence, when the CPU determines that the engine revolution speed Ne is increased at the step S7, the engine is now in the variation state and it is not desired to make an accurate learning. If the CPU determines that the engine revolution speed Ne is not increased at the step S7 (Yes), the routine goes to a step S8.

At the step S8, the CPU calculates a ratio between the variation rates of GRDTN3 and GRDTN1 (=GRDTN3/GRDTN1) and determines whether GRDTN3/GRDTN1 is within a predetermined range Pre.

Even if both variation rates of GRDTN1 and GRDTN3 are equal to or larger than zeros, for example, the reduction rate of the engine revolution speed Ne is varied. In this situation, it is impossible to make the accurate learning for the mechanical variation in the generation timing of the reference signal REF. Thus, at the step S8, the CPU determines whether the ratio of GRDTN3/GRDTN1 falls in a value near to 1 so as to determine whether the engine revolution speed Ne is stably reduced. Thus, the predetermined range Pre includes one.

If the CPU determines that the ratio of GRDTN3/GRDTN1 falls in the predetermined range Pre (=1) at the step S8, the routine goes to a step S9.

At the step S9, the CPU calculates a learning correction value $KTINT_i$ (i denotes a cylinder number) for each of the engine cylinders in order to secure an accuracy of the misfire diagnosis based on the period of TINT corresponding to the mechanical deviation of the generation timing of the reference signal REF.

That is to say, only when the fuel supply is being cut off and the learning conditions described at the steps S4 through S8 are established, and the engine revolution speed Ne is stably reduced, the calculation of the learning correction values of $KTINT_i$ is executed at the step S9.

In the embodiment, with the period corresponding to the combustion state in the first cylinder #1 as a reference, the difference in the period variation on the other cylinders with respect to the reference period variation is assumed to be the mechanical variation between the crank angle measuring the period corresponding to the combustion state of the first cylinder #1 and the crank angle measuring the periods corresponding to the combustion states of the other cylinders. Then, according to the above-described assumption, the learning correction value $KTINT_i$ for each cylinder is calculated as follows:

$$KTINT_3=(TINT5+GRDTN1)/TINT4,$$

$$KTINT_4=(TINT5+2\times GRDTN1)/TINT3,$$

$$KTZNT_2=(TINT5+3\times GRDTN1)/TINT2.$$

It is noted that the learning correction value of KTINT1 for the first cylinder #1 is $KTINT_1=1.0$.

At a step S10, the CPU derives a weight mean value between the stored data of past learning correction values $KTINT_i$ (i=2 through 4) and newly calculated learning correction value $KTINT_i$ (i=2 through 4) at the step S9 for each of the engine cylinders.

$$KTINT_i=\{KTINT_i(new)+(2^x-1)\times KTINT_i(OLD)\}/2^x,$$

wherein x denotes an integer above zero.

At a step S11, the CPU derives a deviation between the learning correction value $KTINT_1$ (=1.0) for the first cylinder #1 and $KTINT_4$ for the fourth cylinder #4 and the deviation between the learning correction value $KTINT_3$ for the third cylinder #3 and $KTINT_2$ for the second cylinder #2.

At the next step S12, the CPU determines whether both deviations fall in predetermined ranges Pre1 and Pre2, respectively.

If either of the deviations exceed its corresponding predetermined range Pre1 or Pre2 at the step S12, the CPU determines that the exceeding matter is caused by the erroneous learning and the present routine is ended without the result of calculation at the step S10 updated into the memory.

That is to say, in the embodiment, the CPU itself generates the reference signal REF for each TDC on the basis of the 180° CA signal from the cam sensor 11a and unit angle signal from the rink gear sensor 11b and measures the generation period of TINT of the reference signal REF. The periods measured as corresponding to the combustion-states of the first and fourth cylinders #1 and #4 are the angle measurement values based on the same angular ranges of the ring gear (crank angle). Similarly, the periods corresponding to the second and third cylinders #2 and #3 are values measured angularly on the basis of the same angle ranges on the basis of the same angular ranges of the ring gear (crank angle).

Hence, in a case where a part of the ring gear has defects and this defects cause the mechanical deviations of the generation timings of the reference signals, the generation timing deviations would act equally upon the first and fourth cylinders #1 and #4 and upon the second and third cylinders #2 and #3.

Then, if the deviations in the generation timing are correctly learned, both of the deviation between the learning correction values KTINT1 and KTINT4 for the first and fourth cylinders #1 and #4 and of the deviation between the learning correction values KTINT3 and KTINT2 for the third and second cylinders #3 and #2 can be estimated to be sufficiently low. If both deviations are large, it can be estimated that the influence of the revolution variation due to other causes than the mechanical deviation in the generation timing of the reference signal REF.

Therefore, at the step S12, the CPU determines whether both deviations between KTINT1 and KTINT4 and between KTINT3 and KTINT2 fall within the predetermined ranges Ref1 and Ref2, respectively, so as to determine whether the normally or nominally the learning has been executed.

If both deviations fall within the predetermined ranges Ref1 and Ref2, respectively (Yes) at the step S12, the routine goes to a step S13. At the step S13, the CPU updates the learning correction value $KTINT_i$ for each cylinder calculated at the step S10 into the memory as the date used to control correctively the period of TINT in the misfire diagnosis actually.

On the other hand, referring back to the step S4, if the CPU determines that it is not the time that the fuel supply cut-off is not being carried out, the routine goes to a step S14 in which each period TINT set at the step S2 is corrected with the learning correction value $KTINT_i$ for each cylinder stored in the memory.

At the next step S15, the CPU calculates a misfire determination value MISA using the corrected period TINT by the learning correction value of $KTINT_i$ as follows:

$$MISA=\{13\times(TINT4-TINT5)+(TINT4-TINT1)\}/TINT5^3.$$

At the next step S16, the misfire determination value of MISA is compared with a reference value SL.

If MISA≧SL (Yes) at the step S16, the routine goes to a step S17 in which the CPU determines the occurrence of the misfire so that, for example, a misfire detection flag MISAF is set to 1.

If MISA<SL (No) at the step S16, the present routine is ended and the CPU determines that no occurrence of the misfire is resulted in.

It is noted that, in the diagnostic routine shown in FIGS. 2A and 2B, any one of the steps S5, S7, S8, and S12 may be determined. Alternatively, any plural steps of the four steps S5, S7, S8, and S12 may be selected and executed.

Furthermore, the determination of occurrence of the misfire may not limited to the misfire determination value.

It is also noted that, when the CPU determines the misfire occurrence, the CPU outputs the warning signal to a warning lamp to turn on the lamp to indicate the occurrence of the misfire.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A method for diagnosing a presence or absence of misfire of fuel supplied in a multi-cylinder, four-cycle internal combustion engine, comprising the steps of:

a) generating a reference signal for each predetermined crank angular timing;

b) measuring a period of the reference signal;

c) detecting a fuel supply cutoff in each of the multi-cylinder engine and detecting a driving condition under which an engine revolution speed is stably reduced at a predetermined rate during the detected fuel supply cutoff, the driving condition serving as a learning condition;

d) learning correction values for the respective cylinders of the period on the basis of the measured period when the driving condition serving as the learning condition is detected at the step c);

e) correcting results of measurements of the period of the respective cylinders on the basis of the learning correction values learned at the step d):

f) detecting presence or absence of misfire in any cylinder of said multi-cylinder engine based on the corrected period for the respective cylinder; and g) providing a warning when the misfire occurrence is determined at the step f).

2. A misfire diagnostic system for a multi-cylinder, four-stroke internal combustion engine, comprising:

a first sensor for detecting an engine crankshaft rotation and outputting a first signal indicative of the engine crankshaft rotated through a predetermined angle;

a second sensor for detecting an engine driving condition and outputting a second signal indicative of thereof;

a control unit for receiving the first and second signals and determining misfire on any cylinder of the multi-cylinder engine, wherein the control unit generates a reference signal for each predetermined crank angular timing based on the first signal, measures a period of the generated reference signal, detects a fuel supply cutoff for each cylinder and a predetermined driving condition based on the second signal, wherein at the predetermined driving condition an engine revolution speed is relatively stably reduced at a predetermined rate after the detected fuel supply cutoff, the predetermined driving condition serving as a learning condition, learns correction values of the period for the respective engine cylinders based on the measured period during the reduction in the engine speed in the learning condition, corrects results of measurements of the period for the respective cylinders based on the learned correction values, and determines presence or absence of misfire in any cylinder of the multi-cylinder engine based on the corrected period for the respective cylinder, and outputs a third signal when misfire is detected.

3. A misfire diagnostic system according to claim 2, wherein the control unit detects the engine driving condition after a predetermined period after the fuel supply cutoff is detected.

4. A misfire diagnostic system according to claim 2, wherein the control unit detects the engine driving condition when a variation in the period for each combustion cycle increases after the fuel cutoff is detected.

5. A misfire diagnostic system according to claim 2, wherein the control unit detects the engine driving condition when a variation rate of the variation quantity of the period for each one measured combustion cycle falls within a predetermined range.

6. A misfire diagnostic system according to claim 2, wherein the control unit calculates a correction value for the period based on the measured period during the fuel supply cutoff detection and detects the engine driving condition when a variation rate of the variation quantity of the period for each one measured combustion cycle falls within a predetermined range.

7. A misfire diagnostic system according to claim 6, wherein the control unit updates and stores the correction value and inhibits the updating and storing of the correction value when deviations between the correction values for the respective cylinders calculated based on the values of the measured periods in a same crank angle range are outside a predetermined range.

8. A misfire diagnostic system according to claim 3, further comprising a ring gear for generating a unit angular signal indicative of an angular displacement of the crankshaft, wherein the first sensor is a cam shaft sensor outputting the reference signal indicative of the engine crankshaft having rotated through a predetermined angular displacement set according to a number of the engine cylinders.

9. A misfire diagnostic system according to claim 2, further comprising a warning means for warning the occurrence of misfire.

10. A misfire diagnostic system according to claim 2, wherein the control unit calculates a misfire determination value MISA for a four-cylinder, four-cycle engine using a calculation $MISA=(3\times(TINT4-TINT5)+(TINT4-TINT1))/TINT5^3$, where TINT4 denotes the period of the reference signal for a fourth cylinder #4, which is corrected by the corresponding learning correction value KTINT4, TINT5 denotes the period of the reference signal for a first cylinder #1, which is corrected by the corresponding learning correction value $KTINTa_1$, and wherein the control unit determines presence of misfire when the value of MISA is equal to or larger than a reference value.

* * * * *